United States Patent
Wen

(10) Patent No.: US 9,652,900 B2
(45) Date of Patent: May 16, 2017

(54) VEHICLE MONITORING SYSTEM

(71) Applicant: Jet Optoelectronics Co., Ltd., Taipei (TW)

(72) Inventor: Michael Tai-Hao Wen, Taipei (TW)

(73) Assignee: Jet Optoelectronics Co., Ltd., Taipei (TW)

( * ) Notice: Subject to any disclaimer, the term of this patent is extended or adjusted under 35 U.S.C. 154(b) by 0 days.

(21) Appl. No.: 14/228,224

(22) Filed: Mar. 27, 2014

(65) Prior Publication Data

US 2015/0274062 A1    Oct. 1, 2015

(51) Int. Cl.
  *G07C 5/00*  (2006.01)
  *G07C 5/08*  (2006.01)
  *B60K 31/18* (2006.01)

(52) U.S. Cl.
  CPC .............. *G07C 5/008* (2013.01); *B60K 31/18* (2013.01); *G07C 5/085* (2013.01); *G07C 5/0808* (2013.01); *G07C 5/0816* (2013.01); *G07C 5/0841* (2013.01); *G07C 5/0858* (2013.01)

(58) Field of Classification Search
  CPC . G07C 5/00; G07C 5/08; G07C 5/008; G07C 5/0841; G07C 5/085; G07C 5/0858; G07C 5/12; G07C 5/0866; G07C 5/0875; G07C 5/0891; G07C 5/0808
  USPC .......................................... 340/465; 701/30.1
  See application file for complete search history.

(56) References Cited

U.S. PATENT DOCUMENTS

| | | | |
|---|---|---|---|
| 5,430,432 A * | 7/1995 | Camhi et al. ................. | 340/438 |
| 5,680,123 A * | 10/1997 | Lee ................................ | 340/937 |
| 6,014,602 A * | 1/2000 | Kithil et al. .................... | 701/45 |
| 6,392,564 B1 * | 5/2002 | Mackey et al. ................ | 340/937 |
| 6,502,035 B2 * | 12/2002 | Levine .......................... | 701/301 |
| 6,556,905 B1 * | 4/2003 | Mittelsteadt et al. ........ | 701/32.4 |
| 6,594,579 B1 * | 7/2003 | Lowrey et al. ............... | 701/123 |
| 6,604,033 B1 * | 8/2003 | Banet et al. ................. | 701/33.2 |
| 6,636,790 B1 * | 10/2003 | Lightner et al. ............. | 701/31.5 |
| 7,821,421 B2 * | 10/2010 | Tamir et al. .................. | 340/901 |
| 8,111,147 B2 * | 2/2012 | Litkouhi ....................... | 340/439 |

(Continued)

FOREIGN PATENT DOCUMENTS

| | | | | |
|---|---|---|---|---|
| GB | 2498224 A * | 7/2013 | ......... | B60R 16/0236 |
| KR | 20020000937 A | 1/2002 | | |

(Continued)

OTHER PUBLICATIONS

S.T. Kim & D.N. Werner, "A Consumer-Oriented Automotive Diagnostic Scanner", University of Illinois (May 2005).*

(Continued)

*Primary Examiner* — David N Werner
(74) *Attorney, Agent, or Firm* — Gokalp Bayramoglu

(57) ABSTRACT

A vehicle monitoring system, comprises: at least a sensor; a head unit; at least a smart unit; wherein the sensor is capable of detecting vehicle status, generating a corresponding signal and then sending the generated signal to the head unit; the head unit is capable of receiving and analyzing the generated signal, and generating an analysis result, and they informing whether the vehicle status is abnormal by outputting a warning in the vehicle or sending the analysis result to the smart unit; the smart unit is authorized by the head unit and capable of displaying the analysis result.

29 Claims, 7 Drawing Sheets

(56) References Cited

U.S. PATENT DOCUMENTS

| | | | | |
|---|---|---|---|---|
| 2002/0138185 | A1* | 9/2002 | Trsar | G07C 5/0808 701/29.1 |
| 2006/0047380 | A1* | 3/2006 | Welch | G07C 5/0808 701/33.4 |
| 2006/0261936 | A1* | 11/2006 | Widmann et al. | 340/435 |
| 2011/0166773 | A1* | 7/2011 | Raz | B60W 40/09 701/123 |
| 2015/0269793 | A1* | 9/2015 | Collins | G07C 5/085 701/31.4 |

FOREIGN PATENT DOCUMENTS

| | | |
|---|---|---|
| KR | 20030001665 A | 1/2003 |
| KR | 20110062082 A | 6/2011 |

OTHER PUBLICATIONS

M. Kowalski & J. O'Donnell, "Apps, etc. remotely monitor teen drivers", USA Today (Jul. 18, 2013).*

S. Brovold, N. Ward, M. Donath, S. Simon, C. Shankwitz, & J. Creaser, "The use of technology to address patterns of risk among teenage drivers", 38 J. of Safety Research 413-422 (2007).*

General Motors, "The 2003 Chevrolet Impala Owner Manual" (Jun. 19, 2012).*

N. Lerner, J. Jenness, J. Singer, S. Klauer, S. Lee, M. Donath, M. Manser, & N. Ward, "An Exploration of Vehicle-Based Monitoring of Novice Teen Drivers: Final Report", Nat'l Highway Traffic Admin. (Aug. 2010).*

The Children's Hospital of Philadelphia, "Teen Drivers: 'The Other Distraction' for Teen Drivers" (Jan. 25, 2013); available online at http://www.chop.edu/news/teen-passengers-other-distraction-teen-drivers.*

J.C. McCall & M.M. Trivedi, "Video-Based Lane Estimation and Tracking for Driver Assistance: Survey, System, and Evaluation", 7 IEEE Transactions on Intelligent Transportation Sys. 20-37 (Mar. 2006).*

D.A. Johnson & M.M. Trivedi, "Driving Style Recognition Using a Smartphone as a Sensor Platform", 14 Int'l IEEE Conf. on Intelligent Transportation Sys. 1609-1615 (Oct. 2011).*

B.F. Wu, W.H. Chen, C.W. Chang, C.J. Chen, & M.W. Chung, "A New Vehicle Detection with Distance Estimation for Lane Change Warning Systems", 2007 IEEE Intelligent Vehicles Symposium 698-703 (Jun. 2007).*

B.G. Lee & W.Y. Chung, "Driver Alertness Monitoring Using Fusion of Facial Features and Bio-Signals", 12 IEEE Sensors J. 2416-2422 (Jul. 2012).*

P. Smith, M. Shah, & N. da Vitoria Lobo, "Monitoring Head/Eye Motion for Driver Alertness with One Camera", University of Central Florida (2000).*

A. de la Escalera, J.M. Armingo, & M. Mata, "Traffic sign recognition and analysis for intelligent vehicles", 21 Image & Vision Computing 247-258 (2003).*

M.L. Eichner & T.P. Breckon, "Integrated Speed Limit Detection and Recognition from Real-Time Video", 2008 Intelligent Vehicles Symposium 626-631 (2008).*

Jim Torresen et al, Efficient Recognition of Speed Limit Signs, Oct. 3-6, 2004, p. 2,3, IEEE.

Peemen, Maurice et al, Speed Sign Detection and Recognition by Convolutional Neural Networks, 2011, p. 4,8, Eindhoven University of Technology.

Marcin L. Eichner et al, Integrated Speed Limit Detection and Recognition from Real-Time Video, Jun. 4-6, 2008, p. 2, 10, IEEE.

Christoph Gustav Keller1 et al, Real-Time Recognition of U.S. Speed Signs, Jun. 4-6, 2008, p. 2, 6, IEEE.

Khan Hafizur Rahman et al, Speed Limit Sign Board Detection & Extraction of Digits in Different Weather Conditions, 2012, p. 7, 11, 15, 22, 39, BRAC University.

* cited by examiner

VEHICLE MONITORING SYSTEM

FIELD OF THE INVENTION

The present invention relates in general to a monitoring system in a vehicle, and more particularly to a system comprising a sensor for sensing the vehicle status, and a head unit for analyzing the vehicle status and then displaying the vehicle status on a display and informing another device about the vehicle status.

BACKGROUND OF THE INVENTION

It is common that when an inexperienced driver drives a car, his/her guardian may be very concerned about his/her driving. For example, an inexperienced driver may forget to fasten a seat belt, may drive at a speed which may be higher than the speed limit, may suddenly push brakes, may be distracted while driving, may drive under an influence of a substance, or an inexperienced driver may go to places he is not supposed to go to. For example an inexperienced driver may be a teenager and may go to a forbidden place like a bar instead of school.

During the normal operation of the car, there may be something wrong with one of the car's systems. For examples brakes may not be working at their full efficiency, the windshield wiper may be broken or may not be working as good as it is expected to work, or the car may be low in fuel, yet the driver may not be aware of any one of these situations. If there is a system where an authorized car maintenance shop is able to discover the status of the car, and then the authorized car maintenance shop may inform the driver or the driver's guardian. This way either the driver or the guardian at a remote location or both the driver in the car and the guardian at the remote location will learn about potential issues of the car systems to take preventative measures.

It is therefore desirable to provide a system for monitoring the status of the vehicle and reporting the status to a driver in the car or to a person at a remote location. The system minimizes the number of specially designed components and facilitates informing the driver directly or informing a user at a remote location from the vehicle thus enables them to be aware of the vehicle status. The system helps improve drivers' safety by informing drivers. The system also helps a user at a remote location to monitor a car's system status and a driver's behavior. Such users can be the driver's guardian, a personnel of a driving school, or the workers of a vehicle maintenance shop.

SUMMARY OF THE INVENTION

In one embodiment of the invention, a vehicle monitoring system is disclosed, the system comprises: at least one sensor, a head unit and at least one smart unit; wherein the sensor is capable of detecting vehicle status, generating a corresponding signal and then sending the generated signal to the head unit; the head unit is capable of receiving and analyzing the generated signal, and generating an analysis result, and then informing whether the vehicle status is abnormal by outputting a warning in the vehicle or sending the analysis result to the smart unit; the smart unit is authorized by the head unit and capable of displaying the analysis result.

In another embodiment of the invention, which discloses a method for operating a vehicle monitoring system, comprising: detecting vehicle status, generating a signal and sending the generated signal via at least one sensor; receiving and analyzing the generated signal via a head unit; determining whether the vehicle status is abnormal according to the generated signal via the head unit; displaying a warning on the head unit or informing at least one smart unit if the vehicle status is abnormal.

DETAILED DESCRIPTION

Figure 1:
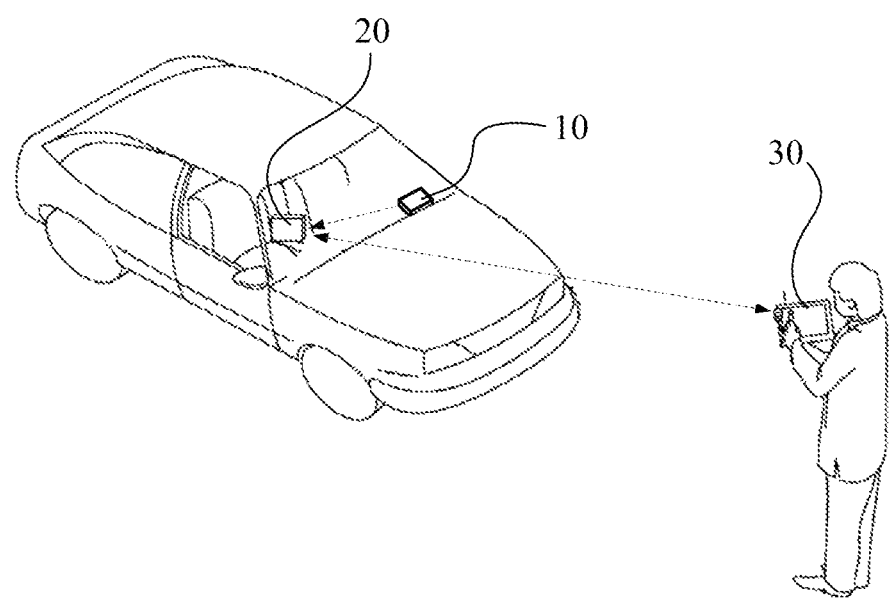
FIG. 1 shows a vehicle and the system with a head unit, a sensor and a smart unit.
Figure 2:
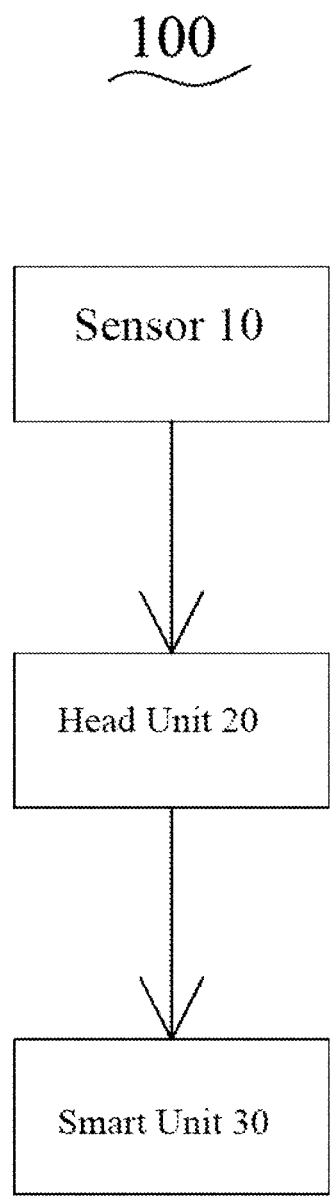
FIG. 2 shows the system configuration with a head unit, a sensor and a smart unit of FIG. 1.
Figure 5:
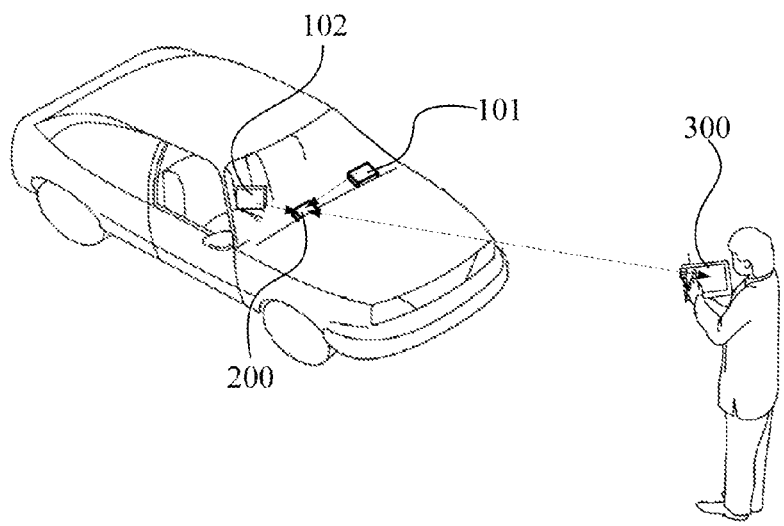
FIG. 5 shows a vehicle and the system with a head unit, multiple sensors and a smart unit of another embodiment.
Figure 6:
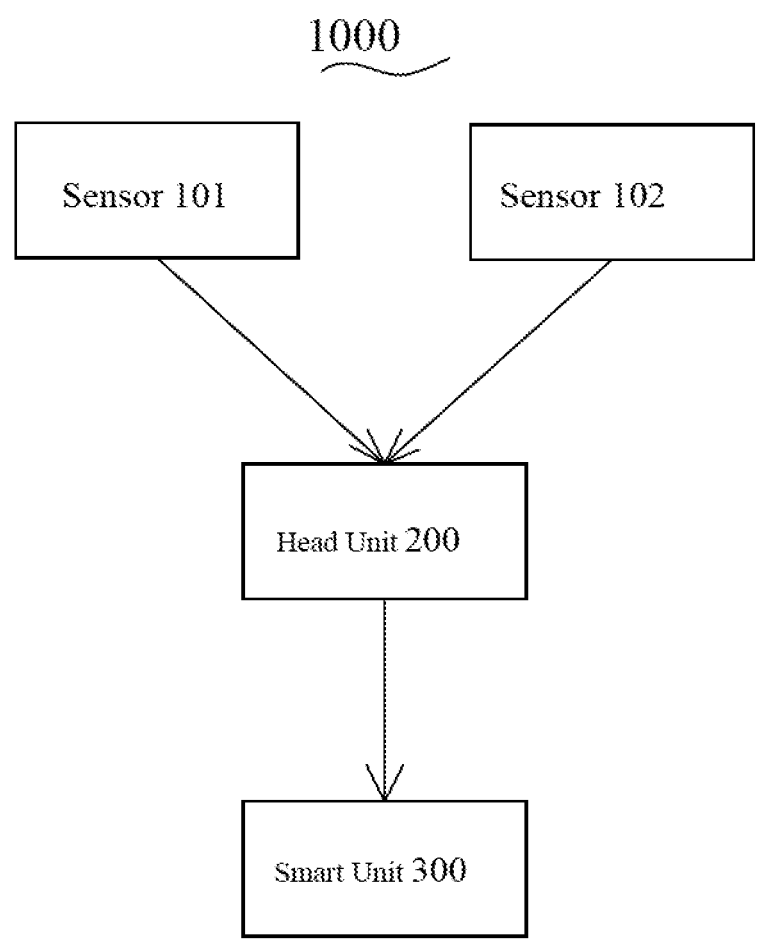
FIG. 6 shows the system configuration with a head unit, multiple sensors and a smart unit of FIG. 5.

An embodiment of the invention is shown in FIG. 1 and FIG. 2. Vehicle monitoring system 100 comprises sensor 10, head unit 20 and smart unit 30. There may be a plurality of sensors disposed in the vehicle monitoring system, and there may be more than one smart unit in the system. The number of sensors and smart units may be increased or decreased based on the circumstances. That is, one or more sensors detect vehicle status, generate a corresponding signal and then send the generated signal to head unit 20; then head unit 20 sends the analysis result to one or more smart units 30. In FIG. 5 and FIG. 6, system 1000 comprises two sensors 101 and 102, a head unit 200 and a smart unit 300; and in FIG. 7 and FIG. 8, system 10000 comprises two sensors 1100 and 1200, a head unit 2000 and two smart units 3100 and 3200.

In FIG. 1, sensor 10 is located inside the vehicle. In other embodiments, sensor 10 may be located outside of the vehicle. The type of sensor 10 is selected from a group of speed sensor, orientation sensor, camera, ultrasonic sensor, infrared sensor, force sensor, proximity sensor, laser sensor, and GPS device. Sensor 10 is capable of detecting the vehicle status, generating a signal indicating the vehicle status, and then sending the generated signal to head unit 20.

Head unit 20 is located in the vehicle, which is controlled by an application program and comprises a screen. Head unit 20 may be at a fixed location in the vehicle, or it may be located in the vehicle such that it is detachable, in which case it may not have a screen. If head unit 20 is a detachable unit, one can detach it and remove it from the vehicle. When vehicle monitoring system 100 is in operation mode, head unit 20 could be plugged into the vehicle via a connecter. The application program may manage a log. The log is a computer file that records the events which happen when the application program is being executed by the system. The log records the behaviors of the driver thus enables the driver's guardian to monitor the driver's behaviors. The log may be stored in head unit 20 that is accessible by only an authorized user such as the driver's parents of smart unit 30. A sample log containing the vehicle and the driver's information is shown in Table I.

TABLE I

| NO. | Time | Event |
| --- | --- | --- |
| 1 | 2014/3/5 3 PM GMT-0800 | Driver's speed is 90 mph. Speed limit is 65 mph. |
| 2 | 2014/3/5 9 PM GMT-0800 | Driver is at a bar on 2312 Main Street. He is not permitted to go to a bar. |
| 3 | 2014/3/6 8 PM GMT-0800 | Driver's car changes lanes for three times in one minute. The standard value is set to not to exceed twice in one minute. |
| 4 | 2014/3/6 10 PM GMT-0800 | Driver's car fails to stop at a stop sign. |
| 5 | 2014/3/7 9 PM GMT-0800 | Driver's car is due for maintenance. |
| 6 | 2014/3/7 10 PM GMT-0800 | Driver forgets to turn off the headlight when getting out of the car. |

As illustrated in Table I, the application program comprises a plurality of algorithms for image processing and object recognition to determine whether the driver is speeding (by capturing images of speed limit signs), whether the driver is changing lanes too frequently (by capturing images of lanes), or whether the driver fails to stop at a stop sign (by capturing images of stop signs on the road). These are a few examples of how the system would operate to sense, capture and report the vehicle status and the driver behavior.

Head unit 20 is capable of receiving and analyzing the generated signal, generating an analysis result according to the generated signal, determining whether the vehicle status is abnormal, and sending this information to smart unit 30 when there is an abnormal condition. The inform step comprises two options, one is directly displaying the analysis result on the screen of head unit 20 for alerting the driver in the vehicle; another is sending the analysis result to authorized smart unit 30. Smart unit 30 displays the result both in audio and visual format. This way, a user in the vehicle could monitor the status of the vehicle systems. Head unit 20 is further capable of recording the analysis result in a log. This analysis results in a log file which is accessible by smart unit 30. The log is sent to smart unit 30 in real-time or periodically by wireless Internet. Smart unit 30 may be a smart phone, a PDA, a tablet or a unit that may be designed especially for the purpose of communicating with head unit 20. If smart unit 30 is a unit especially designed for communicating with head unit 20, smart unit 30 would have hardware components comprising a processor, a transmitter, a receiver, a display and an input device. Smart unit 30 further has an operating system and application program. This way smart unit 30 can be controlled by a user to communicate with head unit 20. When vehicle monitoring system 100 is in operation mode, the location of smart unit 30 is not fixed, smart unit 30 may be in the vehicle or smart unit 30 may be at a remote location outside of the vehicle. A wireless communication link between smart unit 30 and head unit 20 is used. The wireless communication can be GSM, WiFi, radio frequency, infrared, or laser connection that may transfer information between head unit 20 and smart unit 30. Alternatively, sensor 10 and head unit 20 can be combined as one physical unit, for example, sensor 10 is integrated into head unit; so that the vehicle monitoring system only comprises the combined unit (sensor 10 and head unit 20 combined) and smart unit 30 to achieve the same function.

Figure 3:
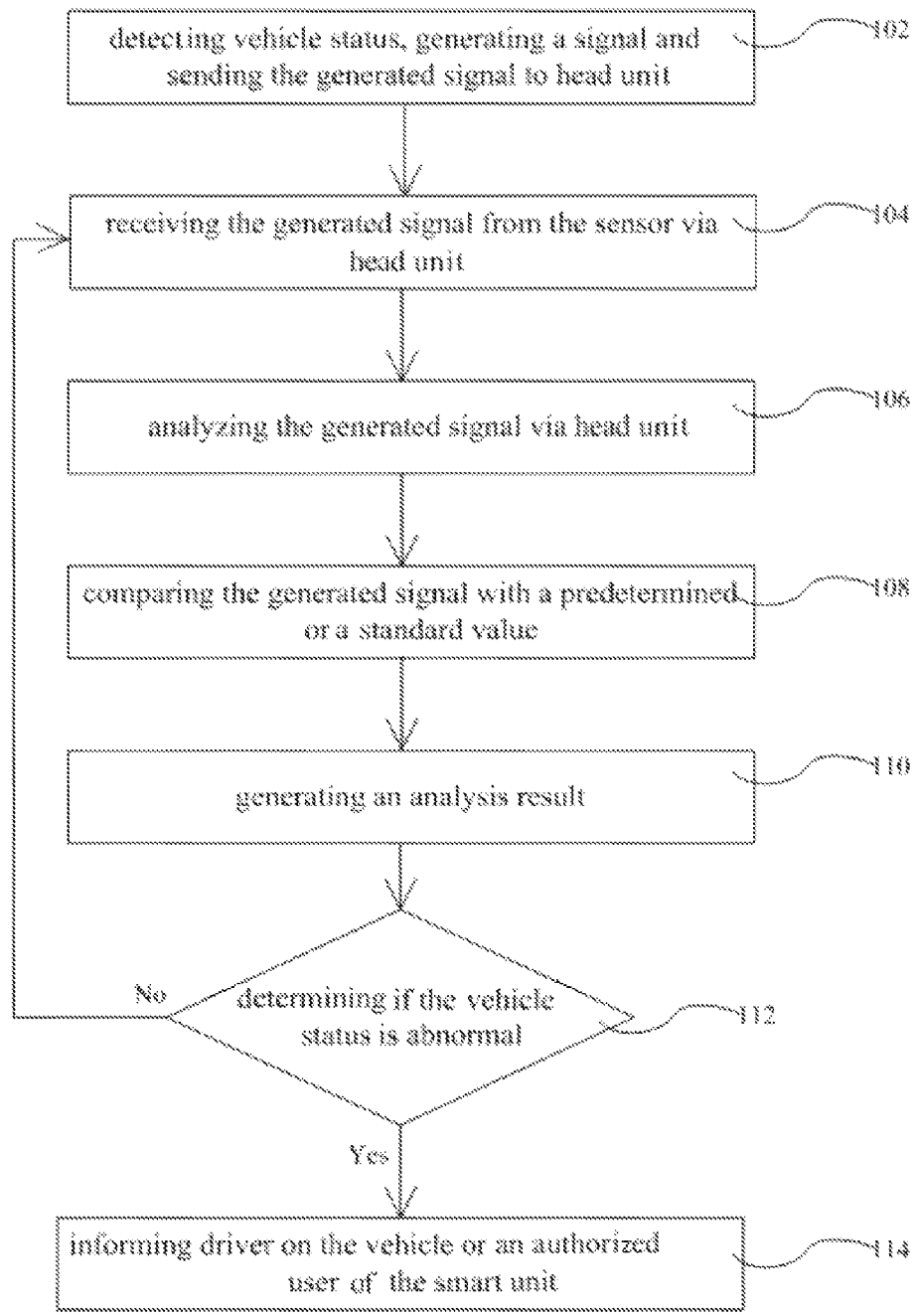
FIG. 3 shows the operation of the system of FIG. 1.

The work process of vehicle monitoring system 100 is illustrated in FIG. 3. In step 102, sensor 10 detects the status of the vehicle, generates a signal indicating the vehicle status and then sends the generated signal to head unit 20. After receiving the generated signal from sensor 10 (step 104), head unit 20 analyzes the generated signal (step 106), compares the generated signal with a predetermined or standard value (step 108) and generates an analysis result (step 110). In step 112, head unit 20 determines whether the generated signal does not conform to the predetermined or standard value. If the generated signal conforms to the predetermined or standard value, then the system goes back to step 104 to receive a new signal sent from sensor 10. The communication between sensor 10 and head unit 20 is accomplished in real-time. That is, sensor 10 keeps sending data to head unit 20, and head unit 20 keeps receiving and analyzing the generated signal. In step 114, if the generated signal does not conform to the predetermined or standard value, which means the generated signal is interpreted as being deviated from any of these standard values, the generated signal will be considered "abnormal" and trigger an alert (per step 114). In that situation, head unit 20 informs the driver in the vehicle directly by showing an alarm on its screen; for example the alarm may be presented as a red flag. This alarm can be set up by user so that different alarm methods can be used. Head unit 20 is also capable of sending the analysis results to smart unit 30 for informing a user of smart unit 30. This way the user of smart unit 30 becomes aware of the vehicle status. The driver has the option to turn off the alarm generated by head unit 20 and therefore in step 114, the informing manner of head unit 20 is preset, therefore the driver in the vehicle may not be informed and only smart unit 30 may receive the analysis result. Alternatively, the system does not allow a driver to turn off the alarm in which case when the generated signal does not conform to the predetermined or standard value, head unit 20 will display alarm and generate audio or visual signals to notify the driver.

The predetermined or standard value may comprise a speed limit, a stop at a stop sign, no stopping at bars, fastening seat belt, frequent lane changing, distracted driving, dangerous driving behavior, and so on. The predetermined or standard value is recorded in the application program, which may be updated via Internet or user input. Only the user of an authorized smart unit 30 is able to change the predetermined or standard value, the user may directly operate on his smart unit 30 or operate on head unit 20 to change the value. Once the value is set, any unauthorized users should not be able to modify the value. For example, an unauthorized user may not be able to modify the types of alerts sent to the authorized users.

Figure 4:
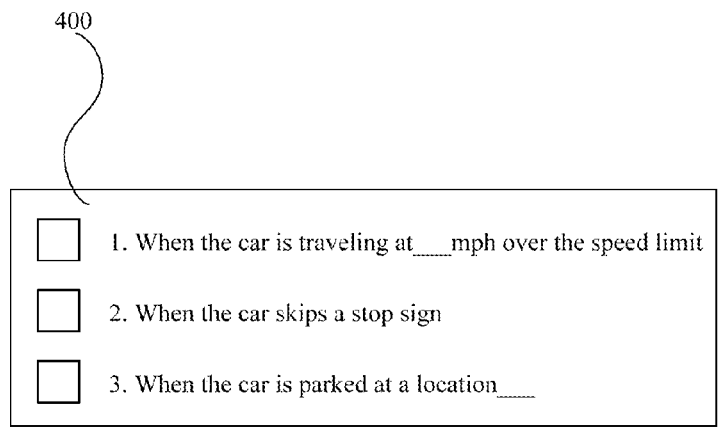
FIG. 4 shows a user interface of an authorized smart unit for setting the predetermined or standard value.

Please refer to FIG. 4, when the user of authorized smart unit 30 wants to change the predetermined or standard value, the authorized smart unit 30 may display several indications, such as "what alerts do you want to receive?", or "what value do you want to change?" Then the authorized user can operate on user interface 400 to select which alerts to receive or which values to change. Take the selection of alerts for example; suppose the user selects the $1^{st}$ alert, the user will need to give a value in the blank to indicate how many mph over the speed limit will trigger the alert. Similarly if the user selects the $3^{rd}$ alert, the user will need to input the locations. The predetermined or standard values comprise all the information needed to let the system know which alerts need to be sent to the authorized users. Such user interface for settings may include other advanced settings, such as the ability for authorized users to set the frequency of receiving alerts (e.g. once a day, once a week, etc.), how to send an alert (e.g. send it to an app on a smart unit, or send it to an email address, or send it to a mobile phone as a text message, etc.) and so forth.

FIG. 5 and FIG. 6 show another embodiment. In this embodiment system 1000 comprises two sensors 101 and 102, one head unit 200 and one smart unit 300. Two sensors 101 and 102 may be any type of sensors to sense vehicle system's status and information and generate proper signals to communicate with head unit 200. Although two sensors 101 and 102 are shown in FIG. 4 and FIG. 5, there may be more sensors in system 1000. Head unit 200 is programmable and it may be programmed by a user or a software program to select which sensor signal should have priority over others. Under normal operation if no priorities are set up, head unit 200 will process signals from sensors 101 and 102 in the order they arrive at head unit 200. This is a scheme similar to first come first serve i.e., the signals are processed by head unit 200 based on their arrival time to head unit 200, an earlier arriving signal will be processed before a later arriving signal to head unit 200. However if head unit 200 is programmed to process signals coming from sensors 101 and 102 in a priority order scheme then head unit 200 will follow the scheme. The processing may comprise a priority processing manner and several normal processing manners. For example in FIG. 4, if head unit 200 receives signal from sensor 101 and if head unit 200 receives signal from sensor 102 while processing a signal from sensor 101 (normal processing manner), head unit 200 will save the processing of signal process from sensor 101 and start processing signal from sensor 102 (priority processing manner). Once the signal from sensor 102 is processed (priority processing manner), head unit 200 will go back to processing the saved process for sensor 101 signal and complete that normal process.

Alternatively, head unit 200 may have the capability of multi-processing. In a multi-processing system, head unit 200 will be able to process certain number of signals coming from multiple sensors. The maximum number for processing signals is predetermined. If the number of signals sent to head unit 200 exceeds the maximum number that may be processed in a parallel manner by head unit 200 then those signals will be processed by head unit 200 based on their time of arrival, which means an earlier signal is being processed first.

A priority algorithm in head unit 200 will enable a user or system program to select priorities for signals coming from different sensors. If head unit 200 allows priorities to be set up, the priorities could be set up either by a user or by the system. If the priorities are set up by a user, then a user determines which sensor signals will have priorities over others. If it is set up by the system, the system will automatically set up priorities based on the current vehicle status, road conditions, weather conditions, and other factors. For example if the vehicle is going down a steep hill it is important for the vehicle that breaks work properly. This means the system may assign priority processing of a signal coming from a brake sensor. If sensors related to vehicle brakes send signals to head unit 200, these signals would have priority over other signals coming from other sensors. For example a signal coming from a sensor of windshield wiper may have to wait until the signal from brake sensor is processed under the condition when the vehicle is traveling down the hill because it is important that brakes work properly when the vehicle is traveling downhill. This scheme of automatic priority setup could be adjusted by the system which makes the system an adaptable system for road and environment conditions.

Figure 7:
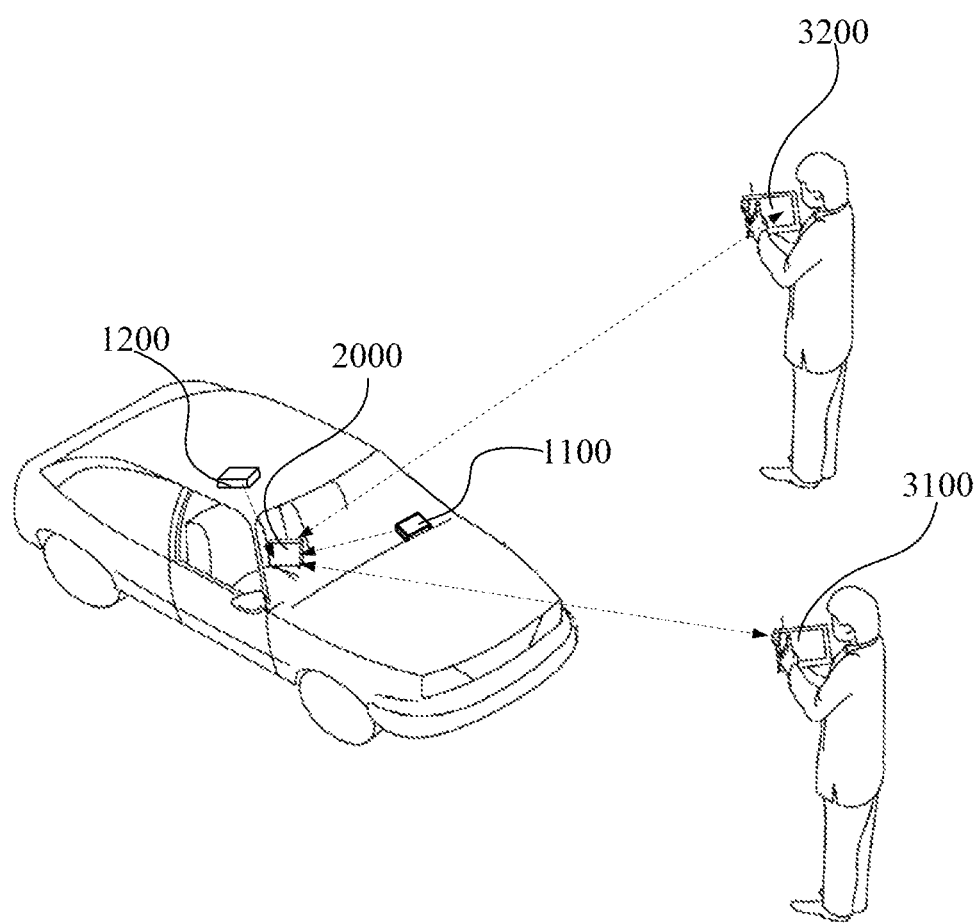
FIG. 7 shows a vehicle and the system with a head unit, multiple sensors and multiple smart units of another embodiment.
Figure 8:
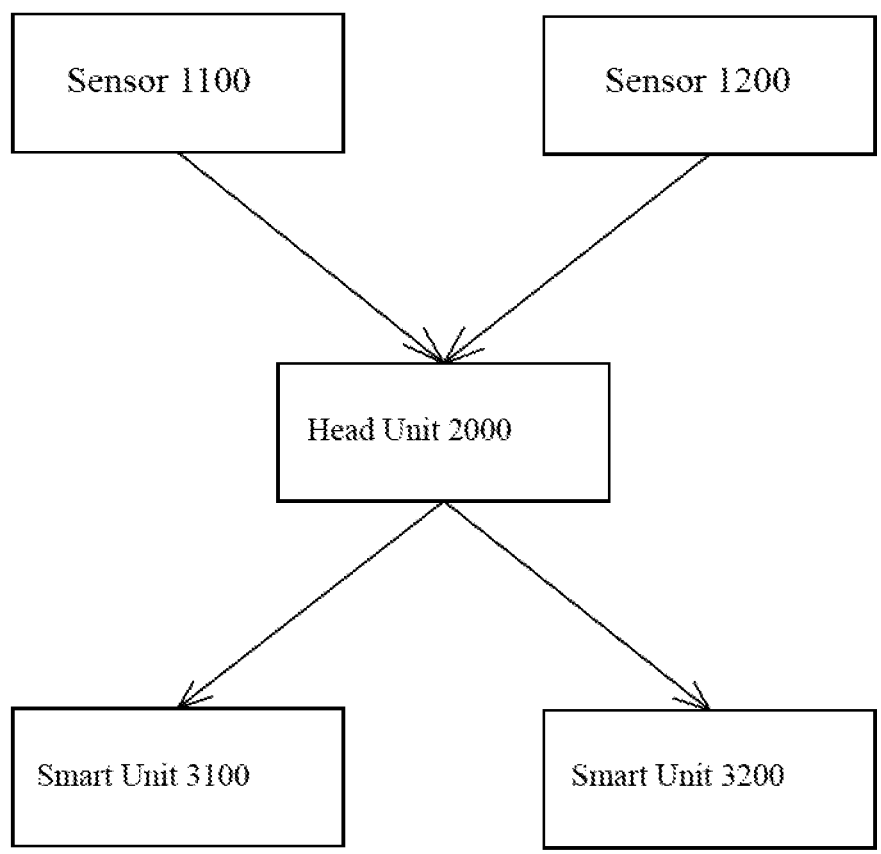
FIG. 8 shows the system configuration with a head unit, multiple sensors and multiple smart units of FIG. 7.

FIG. 7 and FIG. 8 show another embodiment. The difference between this embodiment and the embodiment illustrated in FIG. 5 and FIG. 6 is that in this embodiment there are two sensors 1100 and 1200, one head unit 2000 and two smart units 3100 and 3200. Sensor 1200 is disposed outside of the vehicle. Although two smart units 3100 and 3200 are shown in FIG. 6, there may be more smart units in system 10000. Head unit 2000 is programmable by a user or a software program to select the signal of which sensor corresponds to which smart unit, which smart unit receives analysis result first, and which smart unit receives analysis result while another smart unit doesn't receive analysis result at a certain time.

For example, sensor 1100 and/or sensor 1200 are programmed to send signals to head unit 2000, and head unit 2000 sends an analysis result to smart unit 3100 and 3200 simultaneously. This happens if the users of smart unit 3100 and 3200 are father and mother; both of them want to receive the analysis result. Alternatively smart unit 3100 is pre-assigned by head unit 2000, so head unit 2000 only sends the analysis result to smart unit 3100 while smart unit 3200 doesn't receive the analysis result. This happens if the owner of smart unit 3200 is busy at a certain time, such as attending a meeting or an interview, so smart unit 3200 will be programmed and will not receive any analysis result during certain time. The time could be preset. Alternatively, head unit 2000 may be programmed to send the analysis result to smart units 3100 and 3200 in a priority order. The order is set randomly, or according to certain regularity. The regularity may depend on the distance between the vehicle and smart unit, for example, a nearer or a farther smart unit may receive the analysis result first. The regularity may be according to the availability of owner of the smart unit, if the owner of smart unit 3200 is busy at work while the owner of smart unit 3100 has more time, the analysis result will be sent to smart unit 3100 first, and then sent to smart unit 3200.

An example of the system process is a situation where an inexperienced teenager driver who may be prone to speeding. Whenever the teenager is behind the wheel and is speeding beyond a maximum allowed speed plus some leeway (10 mph for example, which is adjustable) and suddenly slamming on the brake, the maximum allowed speed which is a speed limit set by the traffic regulation; or vehicle's speed fluctuates (i.e. going fast and quickly dropping the speed, and going fast again), such actions will be detected by sensor 10, in this embodiment sensor 10 is a speed sensor. Then sensor 10 sends a signal according to the actions to head unit 20 (step 102). After receiving the generated signal (step 104), analyzing the generated signal (step 106), comparing the generated signal with the maximum allowed speed (step 108) and generating an analysis result (step 110), head unit 20 confirms the vehicle status is abnormal because the driving speed exceeds the maximum allowed speed (step 112), so head unit 20 executes step 114, that alerts the teenager directly by displaying alarm on the screen, or informs his/her parents by communicating with smart unit 30. His parents will then know that the teenager is driving over the speed limit. In another embodiment, the person who has control of smart unit 30 can set up head unit priorities of processing signals coming from sensors. Certainly, vehicle monitoring system 100 is also capable of monitoring other vehicle statuses, such as driving too slow, not maintaining a steady speed, or driving fast and slowly erratically.

If the system detects that the vehicle's steering wheel's direction fluctuates a lot (i.e. turning left and quickly turning right and so on), or the vehicle changes lane frequently, then sensor 10 will detect this behavior. The type of sensor 10 in this case is an orientation sensor or camera. If the type of sensor 10 is a camera, there may be a plurality of cameras facing outside of the vehicle for capturing feeds of the road conditions. Head unit 20 analyzes the changing frequency, compares it with a stored predetermined frequency and generates an analysis result (step 106, step 108 and step 110), determines whether the frequency exceeds the predetermined frequency (step 112), then head unit 20 displays an alarm on its screen to alert the driver or inform smart unit 30 (step 114).

In another embodiment, sensor 10 is a GPS device for detecting vehicle location and sending a vehicle location data to head unit 20. For example, sensor 10 may detect whether the vehicle ignores a stop sign (step 102), if so head unit 20 will alert the driver (step 114). Furthermore, head unit 20 is capable of recording a list of forbidden locations, analyzing a detected location of the vehicle and informing whether the vehicle is stopped at the one of the forbidden locations. If the vehicle is stopped at one of the forbidden locations, head unit 20 will display an alarm on the screen or inform smart unit 30. For example the parent may tell the kid to never go to the bar or the night club, but the kid still goes there so head unit 20 will inform the parent.

The driver should always leave a safe distance between the vehicle and a vehicle in front of the vehicle and not follow the vehicle in front too closely so that he/she can control the vehicle to stop in case of an emergency. In this case, sensor 10 may be a force sensor for detecting an applying force to the brake of the vehicle. Head unit 20 will be able to detect how hard the brake has been applied. Alternatively, sensor 10 is also capable of detecting the abruptness of braking, head unit 20 then compares the value of the detected abruptness with a predetermined limit, if the value of the detected abruptness exceeds the predetermined limit it means the driver slams on the brake too hard or in a hurry; head unit 20 will executes step 114 (informing). The predetermined limit may comprise the reaction time for braking and other measurement standards. This helps measure the response time of the driver while driving. If the driver leaves an insufficient distance between the vehicle and the vehicle in front, head unit 20 will recognize this reckless behavior by comparing the value of the detected force with a standard value. If the detected value exceeds the standard value, head unit 20 will display an alarm. Alternatively, sensor 10 may be an ultrasonic sensor or an infrared sensor a laser sensor or a proximity sensor for detecting a distance between the vehicle and the vehicle in the front. Correspondingly, head unit 20 is capable of comparing the detected distance with a safe distance and executes informing step (step 114) if the detected distance is less than the safe distance.

In another embodiment, the vehicle monitoring system will be able to detect whether all passengers fasten the seat belt, especially the driver. In this case, the type of sensor is a force sensor or a camera, which is capable of detecting whether a seat belt corresponding to its occupied seat is fastened. Please refer to FIG. 5; sensor 101 is a camera for detecting whether the corresponding seat is occupied. Alternatively, sensor 101 is a force sensor and disposed under the corresponding seat for the same function. Force sensor 102 is installed in a head of the seat belt for detecting whether the seat belt of the corresponding seat is fastened. When the system is in operation mode, sensor 101 will cooperate with sensor 102. That is, firstly sensor 101 detects whether the seat is occupied, secondly sensor 102 detects whether the seat belt of the occupied seat is fastened. If the seat belt is not fastened, head unit 200 will execute informing step (step 114).

The driver's parent can set a limit on the number of passengers in the vehicle. The type of sensor 10 is force sensor or a camera for detecting the number of passengers in the vehicle. If sensor 10 is a force sensor, the force sensor may be installed under a seat of the vehicle to detect whether the corresponding seat is occupied. If sensor 10 is a camera, it may be installed on the ceiling of the vehicle facing downward or on a window of the vehicle facing the inside of the vehicle. Head unit 20 compares the detected number with a permitted number (step 108), if the detected number exceeds the permitted number (step 112), head unit 20 will execute informing step (step 114).

The driver may be driving under the influence or a substance such as alcohol or may be doing things that distract him such as texting, speaking on the mobile phone, eating, drinking, singing, adjusting the radio, feeling drowsy, dozing off, and so on. If sensor 10 is a camera facing inside, and head unit 20 comprises a facial and eyeball movement recognition algorithm. The system will be able to see whether the driver is being distracted (step 112). If so the system sends an alert to the parent (step 114).

Furthermore, head unit 20 is capable of informing the driver or user of smart unit 30 whether the driver drives at a forbidden time. For example the parent can set the system to alert him whenever the vehicle is being driven at any time from 12 AM to 5 AM.

Furthermore, head unit 20 is capable of recording a predetermined maintenance date of the vehicle. If the vehicle has passed its regular maintenance date, head unit 20 will execute step 114. For example the college student lives in an apartment away from his parents. His parents would be informed whether the student does not take his car to maintenance shop when it's due for regular maintenance.

In another embodiment, if the driver forgets to turn off the headlight when he gets out of the car, the authorized smart units may receive an alert after step 114. In this situation, the driver's smart unit 10 could be one of the authorized smart units. Another situation is when the vehicle is low on fuel; the authorized smart units will get an alert.

In another embodiment, vehicle monitoring system 100 is used for remote diagnosis. The data (OBD-II error code, etc.) collected by the car's various sensors 10 are sent to head unit 20 (step 102), and head unit 20 sends it to an authorized car shop (step 114), who will contact the driver if they think there's anything wrong (such as brakes of the car are not very effective, the windshield wiper is broken, or the car is low on fuel) with the car so that the driver can take the car to the car shop for repair and maintenance as needed.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:
1. A vehicle monitoring system, comprising:
 a first sensor, wherein the first sensor comprises a speed sensor for detecting a vehicle speed;

a second sensor for detecting the speed limit of the road the vehicle is on;

a head unit, wherein the head unit comprises a screen;

at least one smart unit, wherein the smart unit comprises a processor, a transmitter, a receiver, a display and an input device;

wherein the first sensor is capable of generating a first signal for the detected vehicle speed and then sending the first signal to the head unit;

wherein the second sensor is capable of generating a second signal for the detected speed limit and then sending the second signal to the head unit;

wherein the head unit is capable of receiving and analyzing the first signal and the second signal, and generating an analysis result, and then displaying a warning or sending the analysis result to the smart unit if the vehicle status is abnormal;

wherein the head unit is capable of recording the analysis result in a log which is accessible to the smart unit and is sent to the smart unit periodically or in real-time; wherein the head unit is programmed to process different signals from respective sensors in a parallel manner;

wherein the communication between the first sensor and the head unit takes place in real-time; wherein the communication between the second sensor and the head unit takes place in real-time; and wherein the smart unit is authorized by the head unit and capable of displaying the analysis result and the log in audio or visual format;

wherein the head unit is configured to recognize whether the vehicle status is abnormal by comparing the first signal with a plurality of predetermined values or a plurality of standard values; wherein the predetermined values are set by the user; wherein the standard values are set by the second signal derived from the second sensor; wherein the head unit is capable of determining whether the vehicle is speeding by comparing the detected vehicle speed and the predetermined values or the standard values.

2. The vehicle monitoring system according to claim 1, wherein the system comprises a first camera for capturing a plurality of traffic signs, and the head unit is capable of detecting the speed limit of the road the vehicle is on from the traffic signs.

3. The vehicle monitoring system according to claim 1, wherein the system comprises a first GPS device for detecting the speed limit of the road the vehicle is on.

4. The vehicle monitoring system according to claim 1, wherein the head unit is programmed under a priority algorithm to select one signal from a corresponding sensor as a prioritized task over others, wherein the head unit is configured to process the prioritized task first.

5. The vehicle monitoring system according to claim 4, wherein the priority algorithm defines priority based on the importance of the signals or the arrival times of the signals.

6. The vehicle monitoring system according to claim 1, wherein the first sensor or the second sensor is pre-assigned to the smart unit by the head unit, and the smart unit is capable of receiving the analysis result corresponding to the pre-assigned sensor.

7. The vehicle monitoring system according to claim 1, wherein the head unit is capable of displaying a warning or notifying the smart unit if the vehicle is traveling too slowly according to the predetermined values or the standard values.

8. The vehicle monitoring system according to claim 1, wherein the head unit is capable of displaying a warning or notifying the smart unit if the vehicle is traveling too unreasonably or erratically according to the predetermined values or the standard values.

9. The vehicle monitoring system according to claim 1, the system further comprises a second camera for detecting lane changing of the vehicle; and the head unit is capable of obtaining a frequency of lane changing and displaying a warning or notifying the smart unit when the frequency does not conform to the predetermined values.

10. The vehicle monitoring system according to claim 1, wherein the system further comprises a third sensor wherein the third sensor is capable of detecting direction changes of a steering wheel of the vehicle, and wherein the head unit is capable of obtaining a frequency of the direction changes and displaying a warning or notifying the smart unit when the frequency does not conform to the predetermined values.

11. The vehicle monitoring system according to claim 1, wherein the system further comprises a second GPS device for detecting and sending the current location data of the vehicle to the head unit; and the head unit is capable of recording a list of forbidden locations, comparing the list of forbidden locations and the current location data of the vehicle, and displaying a warning or notifying the smart unit if the vehicle is stopped at one of the forbidden locations.

12. The vehicle monitoring system according to claim 1, wherein the system further comprises a proximity sensor for detecting a distance between the vehicle and the vehicle in front of it; and the head unit is capable of comparing the detected distance with the predetermined values and displaying a warning or notifying the smart unit if the detected distance does not conform to the predetermined values.

13. The vehicle monitoring system according to claim 1, wherein the system further comprises a force sensor for detecting an applied force to a brake of the vehicle; and the head unit is capable of comparing the value of the detected force with the predetermined values and displaying a warning or notifying the smart unit when the detected force does not conform to the predetermined values.

14. The vehicle monitoring system according to claim 1, wherein the system further comprises a seat belt sensor and a seat sensor for detecting if a seat is occupied and if a seat belt of the seat is fastened; and the head unit is capable of displaying a warning or notifying the smart unit if the seat is occupied but the seat belt is not fastened.

15. The vehicle monitoring system according to claim 1, wherein the system further comprises a seat sensor or a proximity sensor for detecting the number of passengers in the vehicle; and the head unit is capable of comparing the number of passengers with the predetermined values and displaying a warning or notifying the smart unit if the detected number does not conform to the predetermined values.

16. The vehicle monitoring system according to claim 1, wherein the system is capable of detecting the fuel level of the vehicle; and the head unit is capable of comparing the fuel level of the vehicle with the predetermined values and displaying a warning or notifying the smart unit if the fuel level of the vehicle does not conform to the predetermined values.

17. The vehicle monitoring system according to claim 1, wherein the system further comprises a third camera and the head unit comprises a facial and eyeball movement recognition algorithm for analyzing if the driver is concentrating on driving; the head unit is capable of displaying a warning or notifying the smart unit if the driver is not concentrating on driving.

18. The vehicle monitoring system according to claim 1, wherein the head unit is capable of displaying a warning or notifying the smart unit if the vehicle is driven at a forbidden time set by the head unit or by the smart unit.

19. The vehicle monitoring system according to claim 1, wherein the head unit is further capable of recording a predetermined maintenance date of the vehicle and displaying a warning or notifying the smart unit if the vehicle is not maintained on the predetermined maintenance date.

20. The vehicle monitoring system according to claim 1, wherein the system further comprises a speed sensor or a force sensor for detecting whether the vehicle has come to a stop; wherein the system further comprises a GPS application or a fourth camera for detecting whether the vehicle is located at a stop sign; and the head unit is capable of knowing whether the vehicle has stopped at the stop sign and displaying a warning or notifying the smart unit if the vehicle has not stopped at the stop sign.

21. A method for operating a vehicle monitoring system of claim 1, comprising:
   setting a plurality of predetermined values for different vehicle status;
   detecting the vehicle speed and generating a first signal for the detected vehicle speed via the first sensor;
   detecting the speed limit of the road the vehicle is on and generating a second signal for the detected speed limit via the second sensor;
   sending the first signal and the second signal to the head unit;
   analyzing the first signal and the signal via the head unit;
   setting the detected speed limit in the second signal as the standard values;
   comparing the first signal with the predetermined values or the standard values via the head unit;
   determining if the vehicle status is abnormal according to the comparison of the first signal and the predetermined values or the standard values;
   displaying a warning in the vehicle or informing at least one smart unit when the vehicle status is abnormal via the head unit;
   wherein the step of analyzing the first signal and the second signal via the head unit further comprises:
      selecting one signal from a corresponding sensor as a prioritized task over others;
      processing the task with the highest priority first.

22. The method for operating the vehicle monitoring system according to claim 21, wherein the head unit is programmed to process different signals from respective sensors in a parallel manner.

23. The method for operating the vehicle monitoring system according to claim 21, the priority algorithm defines priority based on the importance of the signals or the arrival times of the signals.

24. The method for operating the vehicle monitoring system according to claim 21, wherein the first sensor or the second sensor is pre-assigned to the smart unit by the head unit, and the smart unit is capable of receiving the analysis result corresponding to the pre-assigned sensor.

25. The method for operating the vehicle monitoring system according to claim 21, wherein the communication between the first sensor and the head unit takes place in real-time; wherein the communication between the second sensor and the head unit takes place in real-time.

26. The method for operating the vehicle monitoring system according to claim 21, wherein if the first signal does not conform to the predetermined values or the standard values, the vehicle status is considered abnormal; and the head unit is capable of receiving a new signal.

27. The method for operating the vehicle monitoring system according to claim 21, wherein the predetermined values or the standard values are recorded in an application program and capable of being updated via the internet or user input.

28. The method for operating the vehicle monitoring system according to claim 21, wherein the informing methods of the head unit are preset.

29. The method for operating the vehicle monitoring system according to claim 28, wherein the smart unit has the option to turn off the alarm (one of informing method) generated by head unit.

* * * * *